Aug. 2, 1927.

W. C. BRUMDER

PUTTING APPARATUS

Filed April 2, 1923

Inventor:
William C. Brumder
By: [signature] Atty.

Aug. 2, 1927. 1,637,407
W. C. BRUMDER
PUTTING APPARATUS
Filed April 2, 1923 2 Sheets-Sheet 2
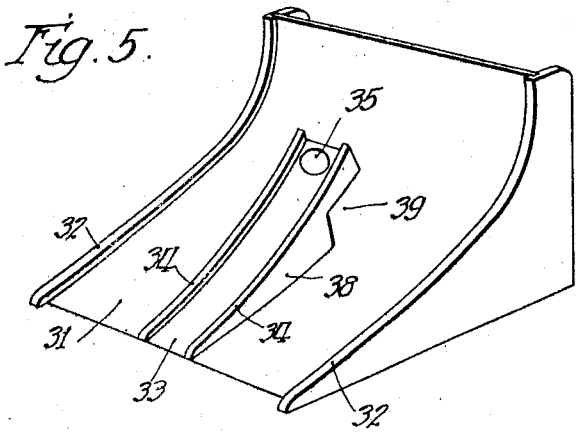
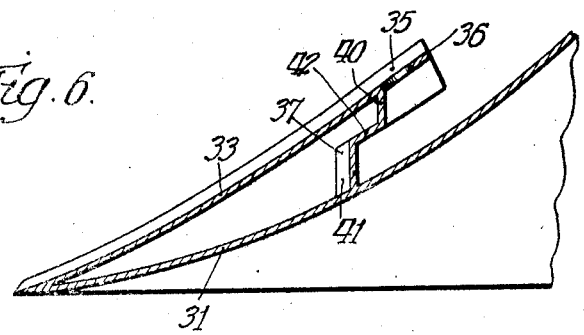
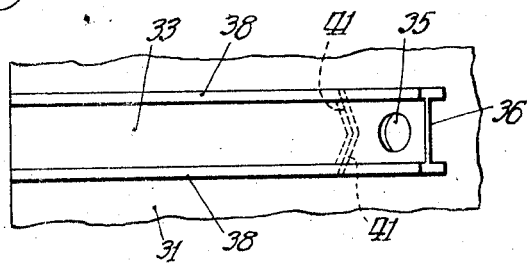

Patented Aug. 2, 1927.

1,637,407

UNITED STATES PATENT OFFICE.

WILLIAM C. BRUMDER, OF MILWAUKEE, WISCONSIN.

PUTTING APPARATUS.

Application filed April 2, 1923. Serial No. 629,395.

My invention relates to golf apparatus, and more particularly to putting apparatus.

It is a purpose of the invention to provide an apparatus of the above mentioned character which is adapted to be used for the purpose of practicing putting and may also be used as a game apparatus for the purpose of developing skill in putting.

It is a further purpose of the invention to provide a device of the above mentioned character comprising an inclined runway having a supplemental runway provided thereon, said supplemental runway being provided with a portion representing a hole and being provided with means for deflecting the ball as desired. Said deflecting means may be so arranged as to indicate whether or not the ball entered the hole when driven by the player. Said means may be so arranged that the ball will be deflected when it enters the hole or that it is deflected when it over-runs the hole.

It is also a purpose of the invention to provide means on the runway indicating the hole which is made of such material that the movement of the ball over the same will create a distinctive sound so as to indicate that the ball has moved over said portion of the runway representing the hole.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 5 is a view similar to Fig. 1 showing means for deflecting the ball upon entering a hole in the runway;

Fig. 6 is a longitudinal section thereof; and

Fig. 7 is a fragmentary plan view thereof.

Figure 1:
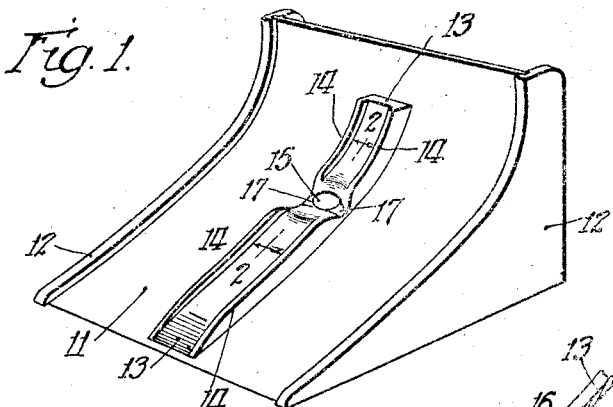
Fig. 1 is a perspective view of my improved apparatus showing means for deflecting the ball from the supplemental runway when the same is hit with the proper force to enter the hole and not over-run the same.
Figure 2:
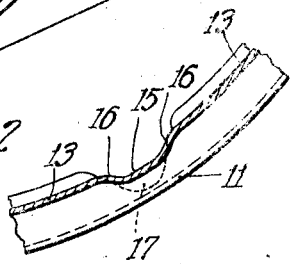
Fig. 2 is a fragmentary sectional view taken on the line 2—2 of Fig. 1.
Figure 3:
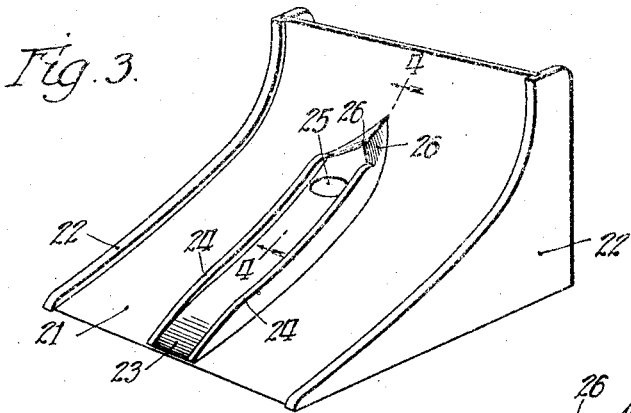
Fig. 3 is a view similar to Fig. 1 showing deflecting means for deflecting the ball from the supplemental runway when the same overruns the hole.

Referring in detail to the drawings, in Fig. 1 is shown a runway having an inclined portion 11 and side members 12 with a supplemental runway 13 mounted on said inclined member 11, said supplemental runway being provided with side members 14 to maintain a ball within the bounds of said supplemental runway after entering the opening at the lower end thereof. Said runway 13, as will be clear from Fig. 1, is higher than the runway 11 and is preferably provided with a depressed portion 15 along the same representing the hole into which the ball is to be driven. The depressed portion 15 is connected with the runway proper 13 by means of inclined portions 16, and the side members 14, adjacent the member 15, are interrupted, and inclined surfaces 17 are provided adjacent the depressed portion 15 so as to deflect a ball that leaves said portion 15 laterally from the supplemental runway 13 to the runway 11. The amount of depression of the portion 15 below the upper surface of the supplemental runway 13 is such that, if a ball is struck with sufficient force that the same would not remain in the hole but would over-run the same said ball would also pass beyond said depressed portion 15 and onto the upper portion of the runway 13, thus not being deflected downwardly along the inclined surfaces 17 to the main runway 11. The depression of the member 15 is also insufficient for the ball on its return from the upper portion of the runway 13 to be deflected due to the inclined surfaces 17 but will continue on down the runway 13 to the bottom thereof. If the ball is struck with sufficient force to reach the portion 15, but not with such force that the same would pass beyond the same in actual putting, said ball will be moved so slowly over the portion 15 of the runway that the same will be deflected due to the inclined portion 17 which will indicate that the ball has properly entered the hole.

Figure 4:
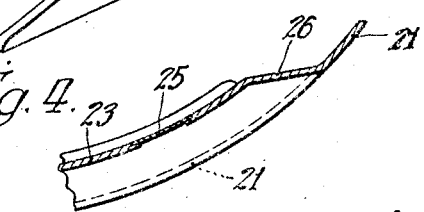
Fig. 4 is a fragmentary sectional view taken on the line 4—4 of Fig. 3.

Instead of providing means for indicating when the ball has entered the hole by deflecting the ball, means may be provided for deflecting the ball after the same has over-run the same so as to indicate that the ball has over-run the hole, due to deflection of the same to either side of the supplemental runway. Such a device is shown in Figs. 4 and 5 in which the inclined runway 21 is provided with side members 22 and a supplemental runway 23 is provided which has the side members 24 for guiding the ball along the same, and said runway 23 is provided with a portion 25 which may be in the form of a metal plate set into the member 23, which member indicates the position of the hole. The upper end portion of the runway 23 is preferably beveled as at 26 so as to provide inclined portions merging with the inclined member 21 so as to deflect the ball to either side of the supplemental runway 23 when the same over-runs the hole, the distance between the member 24 and the beveled portion 26 being such that the ball in moving only as far as the beveled portion 26 without rolling down the same would be struck with such force that it would remain in the hole if played in the ordinary manner on the golf links. The member 25 as pointed out may be of metal, but this is not absolutely necessary, as all that is necessary is that some material be used which will indicate, due to the difference in sound of the ball rolling over the same, that the ball has entered the hole. If for example the ball overruns the hole there will only be one sound of the ball passing over the member 25 as the ball will be deflected down one of the inclined surfaces 26, whereas if the ball enters the hole there will be two sounds, that of the ball moving upwardly along the surface of the member 25 and then downwardly along said same surface. This would be true both when the ball moved beyond the member 25 and when the same only moved onto the member 25 and reversed its direction of movement, as there would be two distinct rolling sounds over the member 25 in each case.

In Fig. 5 an inclined member 31 is shown having side members 32 and having a raised runway 33 thereon. The runway 33 has side members 34 and is provided with an opening or hole 35 located a short distance from the upper end 36 of the runway 33. A wall 37 joins the runways 31 and 33 and the sides 38 are cut away as indicated at 39. The wall 37 comprises a portion 40 extending down from the runway 33, and a pair of laterally inclined members 41 connected by the portion 42.

It will be seen that when the ball enters the opening 35 it will drop into the space under the runway 33 and roll along one of the inclined faces 41, which will direct the ball onto the runway 31 to one side of the runway 33, whereupon the ball will roll down the runway 31 and be returned to the person using the apparatus. If the ball rolls over the end 36 of the runway 33 it will be returned in the same way.

Having thus described my invention, what I desire to claim and secure by U. S. Letters Patent is:

1. A putting apparatus comprising an inclined main runway, an inclined supplemental runway thereon and means for deflecting a ball from said supplemental runway laterally to said main runway.

2. Apparatus of the character described comprising an inclined main runway, an inclined supplemental runway thereon, means on said supplemental runway representing a hole, and means for deflecting a ball from said supplemental runway laterally on said main runway.

3. Apparatus of the character described comprising an inclined main runway, a supplemental runway thereon, said supplemental runway having an opening therein, and means for deflecting a ball from said supplemental runway laterally to said main runway after it has come in contact with said runway.

4. Apparatus of the character described comprising an inclined main runway, a supplemental runway thereon, said supplemental runway having an opening therein, and means for deflecting a ball passing into said opening to said main runway to either side of said supplemental runway.

5. Apparatus of the character described comprising an inclined main runway, a supplemental runway thereon, said supplemental runway having an opening therein, and means for deflecting a ball passing into said opening to said main runway to either side of said supplemental runway, said means also deflecting a ball passing over the end of said runway.

6. Apparatus of the character described comprising an inclined main runway and an inclined supplemental runway extending above and having its lower end substantially flush with the main runway, said supplemental runway having an opening adjacent the upper end thereof whereby a ball may pass therethrough to said main runway.

7. Apparatus of the character described comprising an inclined main runway and a supplemental runway, said supplemental runway having oppositely inclined portions extending from said supplemental runway to said main runway near the upper end thereof.

8. Apparatus of the character described comprising an inclined main runway, a supplemental runway thereon having a greater inclination than said main runway, said supplemental runway having an opening therein, and means for deflecting a ball leaving said supplemental runway laterally on said main runway.

9. Apparatus of the character described comprising an inclined main runway, a supplemental runway thereon, and means for deflecting a ball passing from said supplemental runway to said main runway to either side of said supplemental runway.

10. Apparatus of the character described comprising an inclined main runway, a supplemental runway thereon, and means for deflecting a ball passing from said supplemental runway to said main runway to either side of said supplemental runway, said means also deflecting a ball passing over the end of said runway.

In witness whereof, I hereunto subscribe my name this 23rd day of February A. D., 1923.

WILLIAM C. BRUMDER.